United States Patent [19]

Wang et al.

[11] Patent Number: 4,995,548

[45] Date of Patent: Feb. 26, 1991

[54] PREPARATION PROCESS FOR COEXTRUSION BILLETS WITH MULTIPLE METALLIC CYLINDRICAL LAYERS

[75] Inventors: Chun T. Wang, Salem; Robert H. Scanlon, Albany, both of Oreg.

[73] Assignee: Teledyne Industries, Inc., Albany, Oreg.

[21] Appl. No.: 335,368

[22] Filed: Apr. 10, 1989

[51] Int. Cl.$^5$ ............................................. B23K 20/24
[52] U.S. Cl. ................................. 228/131; 228/156; 228/193; 228/173.2; 228/200
[58] Field of Search ................... 228/131, 156, 173.2, 228/193, 243, 263.21, 200, 231

[56] References Cited

U.S. PATENT DOCUMENTS

| | | | |
|---|---|---|---|
| 4,049,184 | 9/1977 | Rozengart et al. | 228/131 |
| 4,065,302 | 12/1977 | Turillon | 75/208 R |
| 4,372,817 | 2/1983 | Armijo et al. | 376/417 |
| 4,478,363 | 10/1984 | Imahashi et al. | 228/131 |
| 4,754,911 | 7/1988 | Turner | 228/131 |
| 4,808,485 | 2/1989 | Prewo et al. | 428/582 |

*Primary Examiner*—Kenneth J. Ramsey
*Attorney, Agent, or Firm*—Shoemaker and Mattare, Ltd.

[57] ABSTRACT

Coextrusion billets of two or more concentric metallic layers are treated by a hot isostatic pressing process and, then, may be succeeded by heating to an elevated temperature followed by quenching in order to form a diffused bondline between the contiguous touching metal layers, which after extruding and reducing into tubing, is relatively free of bondline defects.

1 Claim, 6 Drawing Sheets

PREPARATION PROCESS FOR COEXTRUSION BILLETS WITH MULTIPLE METALLIC CYLINDRICAL LAYERS

FIELD OF THE INVENTION

This invention relates to an improved method of fabricating multi-layered tubing suitable for nuclear, chemical processing and other industrial applications.

BACKGROUND OF THE INVENTION

In the, conventional process for fabricating seamless tubing with multi-layered metals, coextrusion is generally applied. The extrusion billet is assembled with multiple layers of metallic cylinders one inside the other concentrically. The annular opening at each end of the assembly is sealed by vacuum welding. The billet assembly is preheated to a proper temperature and extruded, forming a metallurgical bond between adjacent layers. The bondline defects are occasionally detected at the as-extruded stage or after the tube is further reduced. The main cause for this problem is due to insufficient time at temperature to effect bonding and diffusion across the bondline during extrusion.

In the conventional process for preparation of two-layered zirconium-zirconium alloy billet, the outer zirconium alloy cylindrical part is first subjected to beta heat treatment by heating at 980 degrees C. to 1200 degrees C. range and water quenching in order to improve corrosion resistance and to achieve fine grain structure for the final tube product. After the billet is assembled with an inner zirconium liner, it is extruded to a tubeshell and further reduced by tube reducers to final size suitable for nuclear fuel cladding applications. A stringent inspection such as ultrasonic technique is used for bondline defects which may be as small as a few thousands of an inch in dimension.

It is, therefore, an objective of the present invention to reduce or eliminate the occurrence of bondline defects in concentric mating surface for tubing with multiple metallic layers.

It is a further objective of the present invention to promote maximum bond strength with diffusion across the interface between the inner and outer metallic layers.

BRIEF SUMMARY OF THE INVENTION

The foregoing and further objects and advantages of the invention hereinafter described are achieved by relatively low temperature isostatic pressing of a multi-layered metallic billet with or without subsequent heating at a higher temperature to promote diffusion across the interface to substantially reduce bondline defects between mating materials at their interface. Preferably, the diffusion bonding process of the present invention is used for fabricating unitary seamless tubular articles, which articles comprise at least two concentric metallic layers formed by fitting the surfaces of the at least two concentric cylindrical parts together to form an extrusion billet assembly, comprising the following steps in order: (1) treating the billet assembly consisting of either zirconium or zirconium alloy by hot isostatic pressing at a range of from about 15,000 to about 45,000 psi and temperature of from about 450° C. to about 1250° C. for sufficient time to form a bond between metallic layers, and (2) heating said billet at a temperature of from about 450° C. to about 1250° C. for a time sufficient to promote diffusion across the bondline of the metallic layers whereby the bonding strength is increased and the occurrence of bondline defects in the finished tubular articles is reduced, and (3) quenching the heated billet by immersion in a quenchant maintained at a temperature in the range of from about 0° C. to about 100° C.

DETAILED DESCRIPTION OF THE INVENTION

In the process of the present invention, the bonding at the interface between concentric cylindrical tubes is achieved by hot isostatic pressing of the billet assembly at a relative low temperature with a high pressure which are sufficient to cause bonding at the interface. The billet assembly may be further heat treated at a higher temperature and ambient pressure in order to cause diffusion across the bondline, and thus further strengthen the bonding between the mating metallic layers.

Figure 2:
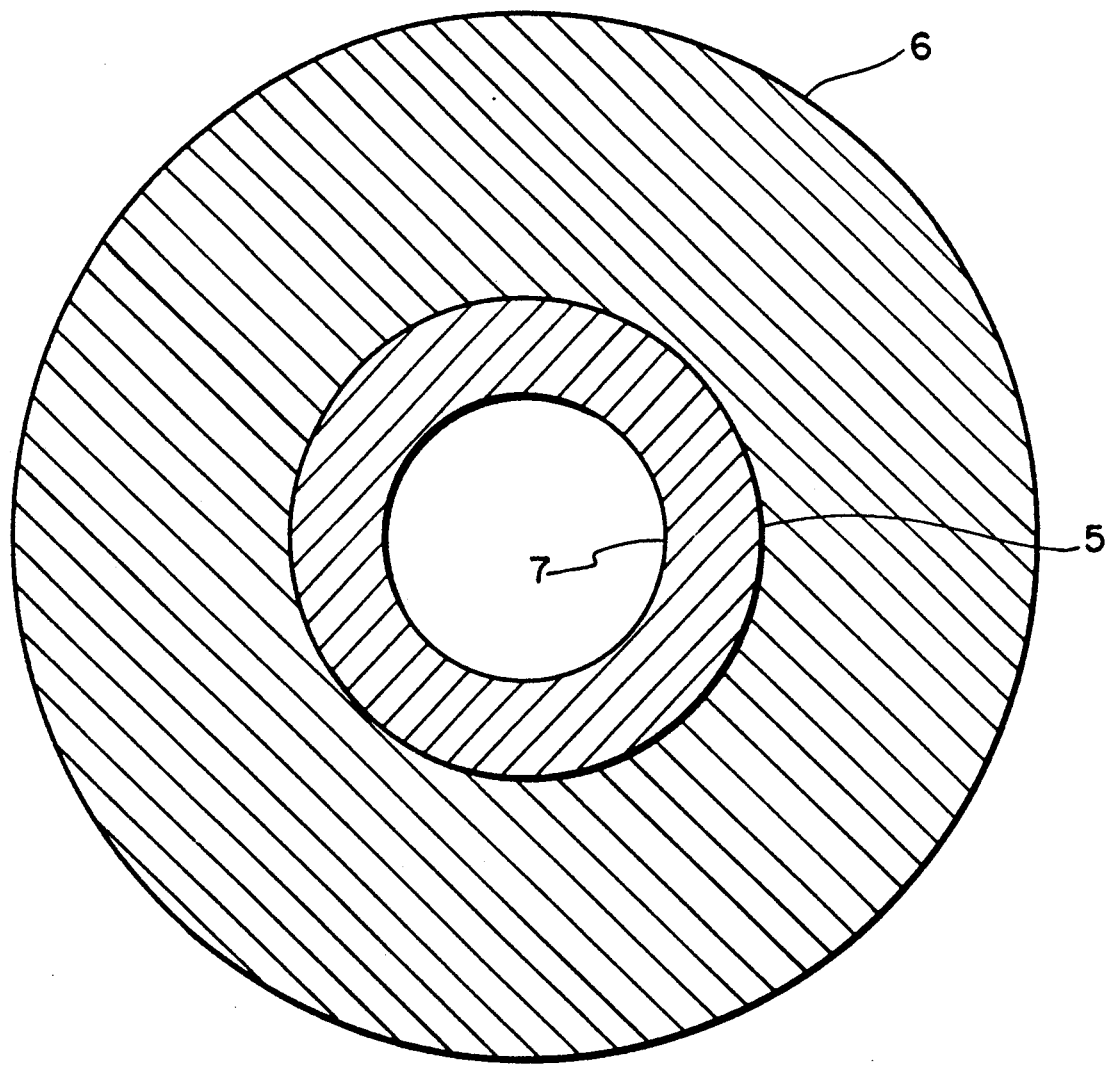
FIG. 2 is a cross sectional view of an assembled two-layered metallic billet. The outer layer is Zircaloy-2 and the inside liner is zirconium.

For a billet of Zircaloy (6) on the outside and zirconium (7) on the inside, as shown in FIG. 2, both cylindrical parts are cleaned, assembled and vacuum welded so that there are no detectable amounts of gases or other foreign materials present between the different metallic layers. The temperature for the subsequent hot isostatic pressing ranges from 600 degrees C. to 800 degrees C., and the argon pressure ranges from 15,000 to 45,000 psi, as is generally commercially available in the industry. Subsequent to the HIP (Hot Isostatic Pressing) step, the billet may be heated in the temperature range of from 1000 degrees C. to 1200 degrees C. (1832 degrees F. to 2192 degrees F.) for a short period of time so that diffusion occurs across the bondline, but not to allow the diffusion on a scale, which could alter the properties of the metal on either side of the bond zone. The billet is then quenched in a quenchant which is preferrably a fast cooling medium. Preferably water is selected as the quench medium although brine or other quenchant agents may be used if desired. The preheating and quenching conditions are selected to that there will also be a precipitation of fine second phase particles which serve as the nucleation sites for recrystallization, and also impart improved corrosion resistance of one or all of the metallic layers.

Figure 1:
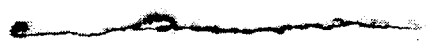
FIG. 1 is a photomicrograph at 180x showing a typical bondline defect between the upper Zircaloy-2 and the lower zirconium materials which had been coextruded from an assembled billet by conventional process described herein, the sample being stain etched.

When the billet is thus prepared, and extruded or further reduced into tubing, the bondline will remain diffused, and relatively free of defects. FIG. 1 shows a typical bondline defect obtained from the conventional practice described herein and is shown for comparison purposes with the product produced by the practice of the present invention.

The following examples will further clarify the process.

EXAMPLE 1

Figure 3:
FIG. 3 is a photomicrograph at 180x of a stain etched diffused bondline between upper zirconium and lower Zircaloy-2 materials prepared by HIP (Hot Isostatic Pressing) and quenching according to the present invention.

After assembling and vacuum welding, a zirconium-Zircaloy 2, (Zrl-1.5%Sn-0.2%Fe-0.1Cr-0.05Ni) billet, 6.0" OD×1.650" ID×length (as shown in FIG. 2), was treated in a hot isostatic pressing vessel, under 15,000 psi argon pressure and at 740 degrees C. for 2 hours. After removing from the vessel, the billet was preheated, in an induction furnace, and held at 1150 degrees C. for 3 minutes, and then quenched in 20 degrees C. water. A photograph of the transformed beta microstructure at 5" above the bottom end of the quenched billet, longitudinal view, is shown in FIG. 3. The sample was stain etched so that Zircaloy-2 exhibited a dark grey color, while the zirconium was bright. The lack of a sharp bondline indicates that the desired degree of diffusion between the bonded components has occurred.

Figure 4A:
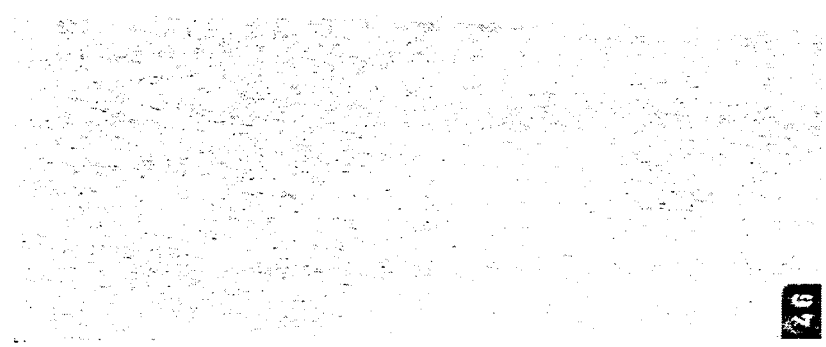
FIG. 4a and 4b are photomicrographs of a stain etched diffused bondline between upper zirconium and lower Zircaloy-2 materials prepared according to the present invention after the billet assembly is extruded at (a) 180x and (b) 750x.
Figure 4B:
Figure 5A:
FIGS. 5a and 5b are photomicrographs of non-diffused bondline between upper zirconium and lower Zircaloy-2 materials from a conventional extrusion at (a) 180x and (b) 750x.
Figure 5B:
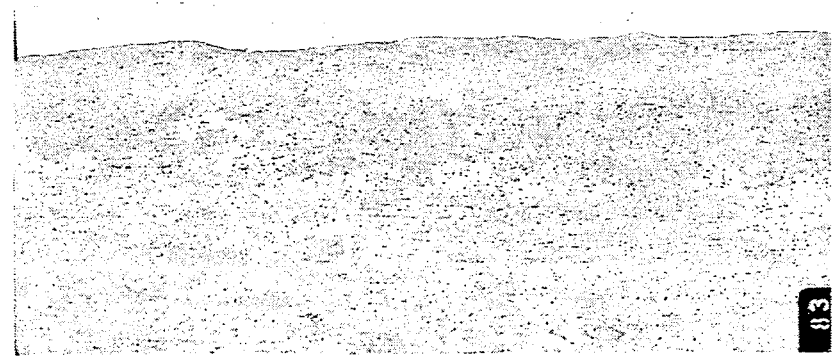
Figure 6A:
FIGS. 6a and 6b are photomicrographs respectively at 750x of the same materials of 4(b) and 5(b) with the specimens etched with $HNO_3$—HF—$H_2O$ to show grain structure.
Figure 6B:

After the billet was extruded to 2.5" OD×1.650" ID×length, and annealed at 663 degrees C. for 2 hours, samples were taken from one end of the tube for microstructure examination. The photographs of the stain-etched specimen are shown in FIG. 4, (a) and (b) at 180x and 750x, respectively. At lower (180x) magnification, the bondline between zirconium and Zircaloy-2 is visible while at higher (750x) magnification, the bondline is rather diffused. FIGS. 5a and 5b are photomicrographs of a bondline of a coextruded tube of the same dimensions with similar processing for billet preparation, except that no hot isostatic pressing and quenching steps were taken. It is apparent that no diffusion across the bondline occurred for this sample. FIGS. 6a and 6b are corresponding views of the diffused and non-diffused bondlines showing the difference in grain structure present in the vicinity of the bondlines.

In a pure zirconium liner, the contents of oxygen, Sn, Fe, Cr, and Ni are generally low as compared to Zircaloys, which renders its high ductility and its high resistance to iodine induced stress corrosion cracking in nuclear reactor applications. Sampling of a billet consisting of a zircaloy-2 outer layer and a Zr liner, which was processed as mentioned in the example, showed that the diffusion of any of the elements mentioned above was limited to 3.74% of the liner thickness (Table 1). The experiment indicated that the desirable properties of zirconium described were essentially not affected by the HIP and beta quench process, and, thus the zirconium treated in this manner can serve as well as a conventional tube liner in a nuclear reactor environment.

EXAMPLE 2

An assembled and vacuum welded Zr-2.5%Nb/Zircaloy 4 (Zr-0.15Sn-0.2Fe-0.1Cr) billet, 6.0" OD×1.650" ID×length, was first hot isostatic pressed under a pressure of 15,000 psi argon, and at a temperature of 615 degrees C. for 3 hours. The treated billet was then preheated and held at 1150 degrees C. for 3 minutes and quenched into 20 degrees C. water. The billet was then extruded at 650 degrees C. to 2.5" OD×1.650" ID×length. The diffused bondline is similar to that described in Example 1.

The present invention has been described in its preferred embodiment. It will be appreciated, however, that the advantages obtained can be achieved with a wide variety of material sizes utilizing the teachings contained herein. The invention described therefore is intended to be limited only by the scope of the appended claims in view of the pertinent prior art.

TABLE 1

Chemical Analysis for Zr Liner of a Billet With Zircaloy-2 Outer Component
(Liner Dimensions: 2.720" OD × 1.650" ID × L)

| ID, in. From | To | Sn | Cr | Fe | Ni | O |
|---|---|---|---|---|---|---|
| 1.650 | 2.000 | <10 | <50 | 230 | <35 | |
| 2.000 | 2.480 | <10 | <50 | 235 | <35 | 420 |
| 2.480 | 2.520 | <10 | <50 | 225 | <35 | |
| 2.520 | 2.560 | <10 | <50 | 235 | <35 | |
| 2.560 | 2.600 | <10 | <50 | 225 | <35 | 470 |
| 2.600 | 2.640 | <10 | <50 | 230 | <35 | |
| 2.640 | 2.680 | <10 | <50 | 220 | <35 | |
| 2.680 | 2.720 | <10 | <50 | 375 | 120[1] | 570 |

[1] Calculation of observed maximum diffusion distance for alloying elements and oxygen:
$(2.720" - 2.680")/2 = .020"$
Total liner thickness = $(2.720" - 1.650")/2 = .535"$
Thickness ratio = $\frac{.020"}{.535"} = 3.74\%$

We claim:

1. A diffusion bonding process for fabricating unitary seamless tubular articles, which articles comprise at least two concentric metallic layers formed by fitting the surfaces of at least two concentric cylindrical parts together to form an extrusion billet assembly, comprising the following steps in order:
   (1) treating the billet assembly consisting of either zirconium or zirconium alloy by hot isostatic pressing at a range of from about 15,000 to about 45,000 psi and temperature of from about 450° C. to about 1250° C. for sufficient time to form a bond between metallic layers, and
   (2) heating said billet at a temperature of from about 450° C. to about 1250° C. for a time sufficient to promote diffusion across the bondline of the metallic layers whereby the bonding strength is increased and the occurrence of bondline defects in the finished tubular articles is reduced, and
   (3) quenching the heated billet by immersion in a quenchant maintained at a temperature in the range of from about 0° C. to about 100° C.

* * * * *